United States Patent
Atlas et al.

(10) Patent No.: US 6,208,339 B1
(45) Date of Patent: Mar. 27, 2001

(54) USER-INTERACTIVE DATA ENTRY DISPLAY SYSTEM WITH ENTRY FIELDS HAVING DISTINCTIVE AND CHANGEABLE AUTOCOMPLETE

(75) Inventors: Marshall Allan Atlas, Austin, TX (US); Michael Franz DiAngelo, Holly Springs, NC (US); Richard Walton Ragan, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/100,712

(22) Filed: Jun. 19, 1998

(51) Int. Cl.[7] .................................................. G06F 13/00
(52) U.S. Cl. .......................... 345/338; 345/347; 345/352; 707/507
(58) Field of Search ..................... 340/339, 340; 707/507, 508; 345/338, 347, 352, 353, 354, 902

(56) References Cited

U.S. PATENT DOCUMENTS

| 5,544,285 | 8/1996 | Glaser et al. ......................... 395/149 |
| 5,600,778 | 2/1997 | Swanson et al. ...................... 395/333 |
| 5,603,034 | 2/1997 | Swanson .............................. 395/701 |
| 5,666,502 | * 9/1997 | Capps ................................. 345/352 |
| 5,673,401 | 9/1997 | Volk et al. ........................... 395/327 |
| 5,682,538 | * 10/1997 | Lemire et al. ....................... 707/507 |
| 5,950,201 | * 9/1999 | Van Huben et al. .................. 707/10 |
| 5,956,031 | * 9/1999 | Berteig et al. ...................... 345/339 |

OTHER PUBLICATIONS

*IBM Technical Disclosure Bulletin*, "Entry Field Color Identification", vol. 39, No. 04, Apr. 1996, p. 141.

* cited by examiner

*Primary Examiner*—Ba Huynh
(74) *Attorney, Agent, or Firm*—Jerry B. Kraft; Jeffrey S. Labaw

(57) ABSTRACT

A computer controlled interactive display system for for providing a user interface for data entry with user changeable autocomplete functions for the data entry fields. For each of the fields, there is provided autocomplete means, i.e. means for automatically providing a proposed completion of a user entry into at least one of said fields, and user-interactive means for selectively disabling or otherwise modifying said means for automatically providing a proposed completion. Further means are provided for indicating whether said means for automatically providing a proposed completion of user entries has been disabled for a data entry field.

24 Claims, 6 Drawing Sheets

IBM Sample Panel -- Autocomplete  50

Autocomplete demo for Social security Number.  51  54

URL address

TCP/IP address  52  55

Social Security Number  56

53

OK

USER-INTERACTIVE DATA ENTRY DISPLAY SYSTEM WITH ENTRY FIELDS HAVING DISTINCTIVE AND CHANGEABLE AUTOCOMPLETE

TECHNICAL FIELD

The present invention relates to user-interactive computer supported display technology, and particularly to such user-interactive systems and methods which provide interactive users with an user friendly interface for data entry.

BACKGROUND OF THE INVENTION

The 1990's decade has been marked by a technological revolution driven by the convergence of the data processing industry with the consumer electronics industry. This advance has been even further accelerated by the extensive consumer and business involvement in the Internet over the past two years. As a result of these changes it seems as if virtually all aspects of human endeavor in the industrialized world requires human/computer interfaces. There is a need to make computer directed activities accessible to a substantial portion of the world's population which, up to a few years ago, was computer illiterate or, at best, computer indifferent. In order for the vast computer supported market places to continue and be commercially productive, it will be necessary for a large segment of computer indifferent consumers to be involved in computer interfaces.

One function which developers of display interfaces have been addressing is ease of use in the entry of data, and particularly the entry of textual data. No matter how intuitive and easy to use an interface may be in its use of icons and related three-dimensional real life to make even the novice user feel at home with the interface, in most human/computer transactions a point is reached when the user must enter data, particularly text data. Unfortunately, most people have limited capabilities with the keyboard which still remains the primary means for entering text into a computer display interface. Data entry system designers recognizing users' limited ability with the keyboard have developed a variety of expedients making text data entry easier. One such expedient in relatively widespread use has been the autocomplete function. Autocomplete involves the system into which the data is being entered developing and saving a library of possible entries for each of a group of data fields required to be entered by the user. Such entry fields could include, for example, names, part descriptions, part numbers, social security numbers and/or telephone numbers. These libraries are developed, to some extent, based upon the historical frequency of usage by either an individual, group, whole industry or business field. Then, as the user starts to make a particular entry, the system attempts to autocomplete by providing a proposed complete entry based upon the portion of text or like data already entered, extrapolated against the stored entries in the library. If the proposed entry coincides with the intended user entry in the field, the user may move on to the next field where autocomplete may again be provided. Accordingly, in an interface such as a tax form or other type of business form, it may be understood that the completion of the entries could be substantially expedited.

On the other hand, such autocomplete functions could confuse the user, particularly in the case of multiple entry fields and with users of limited computer data entry experience. The user could loose track of which entry fields were autocompleted and which were based totally upon the user's own data. In this connection, with a given entry, the user could be confused into accepting the proposed autocomplete entry and moving on to the next entry field even though the proposed entry is different from the intended entry. Thus, with certain combinations of users and entry data types, autocomplete functions may actually make the user display interface more difficult.

SUMMARY OF THE INVENTION

The present invention enables the user to selectively disable and enable, or otherwise change, autocomplete functions for particular entry fields; and it provides the user with a visible indication as to whether an entry field has an enabled or disabled autocomplete. It provides a computer controlled user-interactive display system with a user interface including a plurality of data entry fields on said display together with means for interactive user entry of data into said fields. An autocomplete function is provided which comprises means for automatically providing proposed completions of user entries into the fields, and user-interactive means for changing the mode of operation of said means for automatically providing proposed completions. Such means for changing most usually involve either enabling or disabling the autocomplete mode, but such means may also change the mode of how the proposed completions are determined, as well as the order in which the proposed completions for each entry are presented to the user.

The present invention also comprehends changing the mode of operation of autocomplete functions either globally for all entry fields or selectively on a field-by-field basis. In accordance with another aspect of the present invention, means are provided for visually indicating for which data entry fields particular autocomplete modes are provided, e.g. symbols indicating the data entries for which autocomplete functions are enabled.

DETAILED DESCRIPTION OF THE PREFERRED EMBODIMENT

Figure 1:
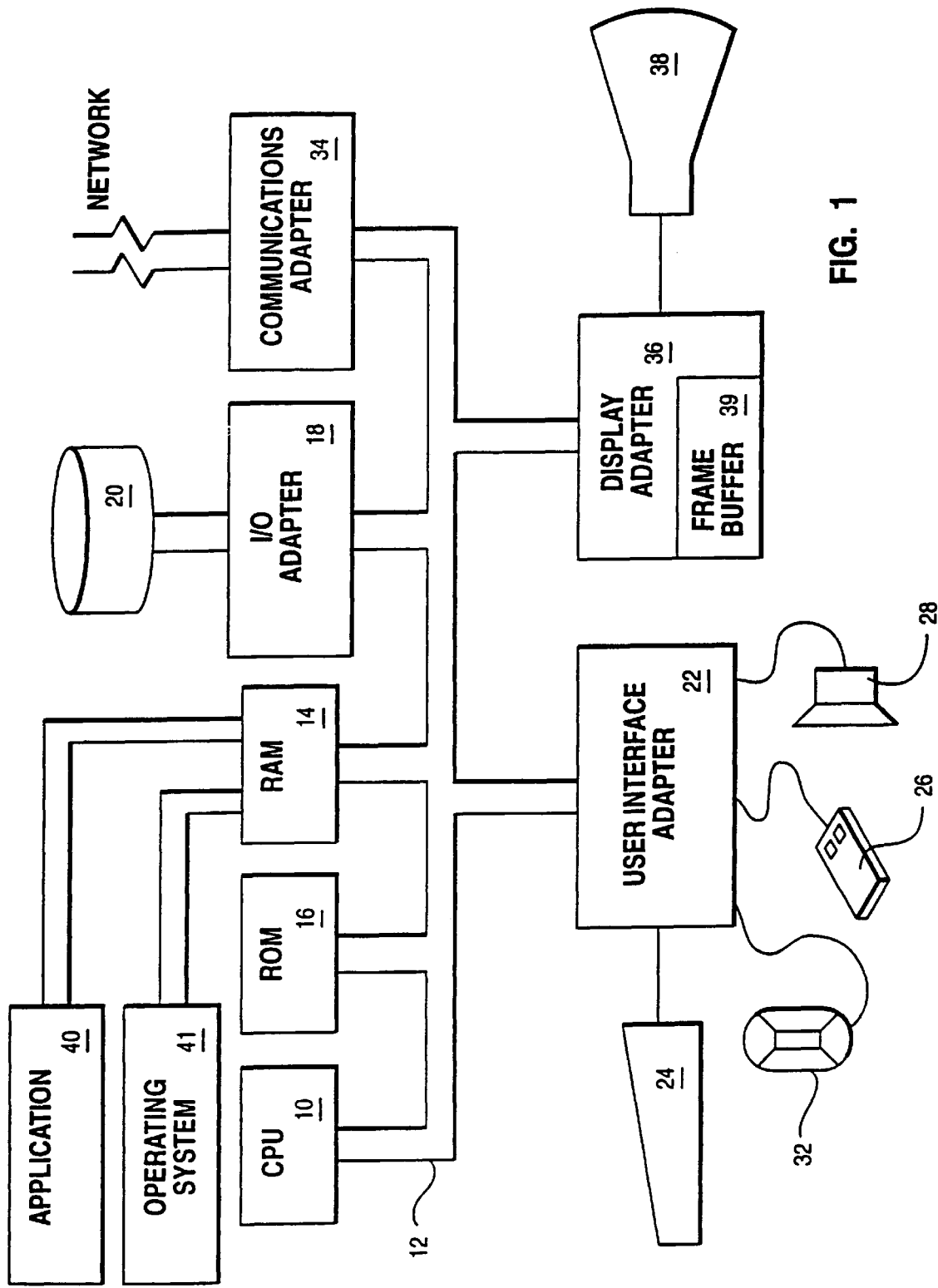
FIG. 1 is a block diagram of a data processing system including a central processing unit which is capable of implementing the present invention.

Referring to FIG. 1, a typical data processing system is shown which may function as the computer controlled display system used for the data entry system of the present invention with modifiable autocomplete functions. A central processing unit (CPU), such as one of the PC microprocessors available from International Business Machines Corporation, is provided and interconnected to various other components by system bus 12. An operating system 41 runs on CPU 10, provides control and is used to coordinate the function of the various components of FIG. 1. Operating system 41 may be any one of commercially available systems such as the OS/2 operating system available from International Business Machines Corporation (OS/2 is a trademark of International Business Machines Corporation); Microsoft Windows 95™ or Windows NT™, as well as Unix and AIX operating systems. A programming application for data entry in a plurality of entry fields with user modifiable auto-completion functions, application 40 to be subsequently described in detail, runs in conjunction with operating system 41 and provides output calls to the operating system 41 which implements the various functions to be performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the application 40 are loaded into RAM 14, which is the computer system's main memory. I/O adapter 18 may be a small computer system adapter that communicates with the disk storage device 20, i.e. a hard drive. Communications adapter 34 interconnects bus 12 with an outside network enabling the data processing system to communicate with other such systems, particularly when the operations controlled by the interfaces of the present invention are in a network environment or when the controlled operations are in communication systems. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39 which is a storage device that holds a representation of each pixel on the display screen 38. Images may be stored in frame buffer 39 for display on monitor 38 through various components such as a digital-to-analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention with respect to the display screens of FIGS. 2 through 7. When the screen images are described, it will be understood that these may be rendered by storing image and text creation programs, such as those in any conventional window operating system in the RAM 14 of the system of FIG. 1. The operating system is diagrammatically shown in FIG. 1 as operating system 41. The display screens of FIGS. 2 through 7 are presented to the viewer on display monitor 38 of FIG. 1. In accordance with conventional techniques, the user may control the screen interactively through a conventional I/O device such as mouse 26 of FIG. 1, which operates through user interface 22 to call upon programs in RAM 14 cooperating with the operating system 41 to create the images in frame buffer 39 of display adapter 36 to control the display on monitor 38.

Figure 2:
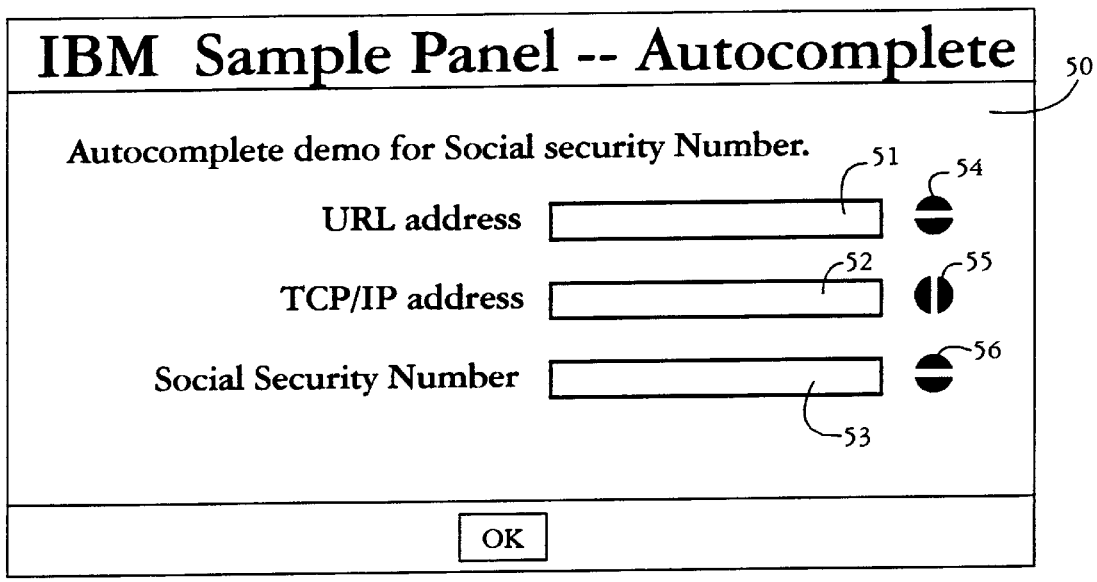
FIG. 2 is a diagrammatic view of a data entry display screen at an initial stage to illustrate the present invention.
Figure 3:
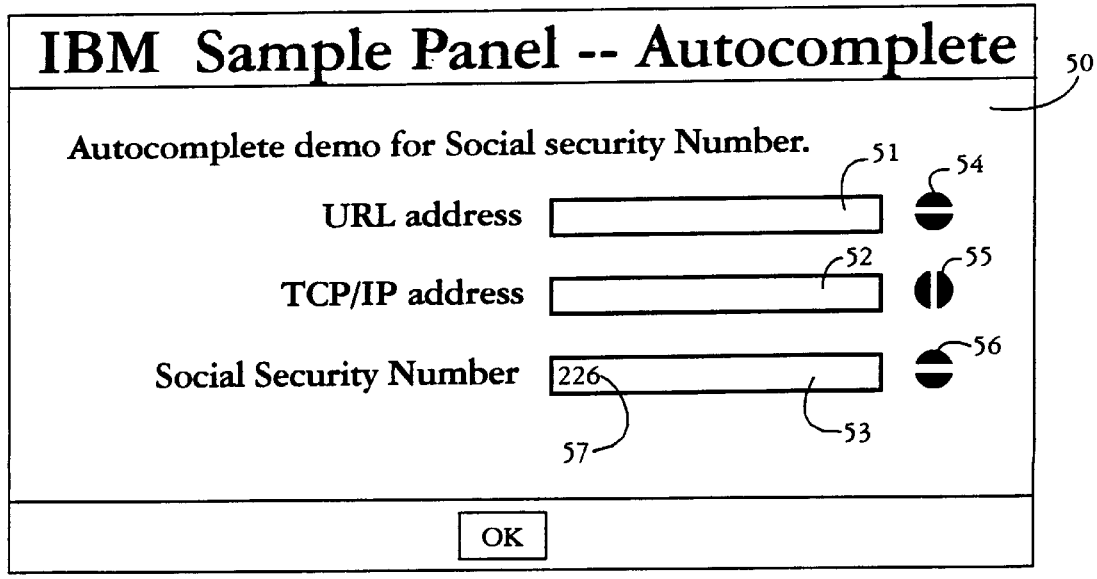
FIG. 3 is the same display screen of FIG. 2 at a point where the user starts to make an entry into a field with autocomplete.
Figure 4:
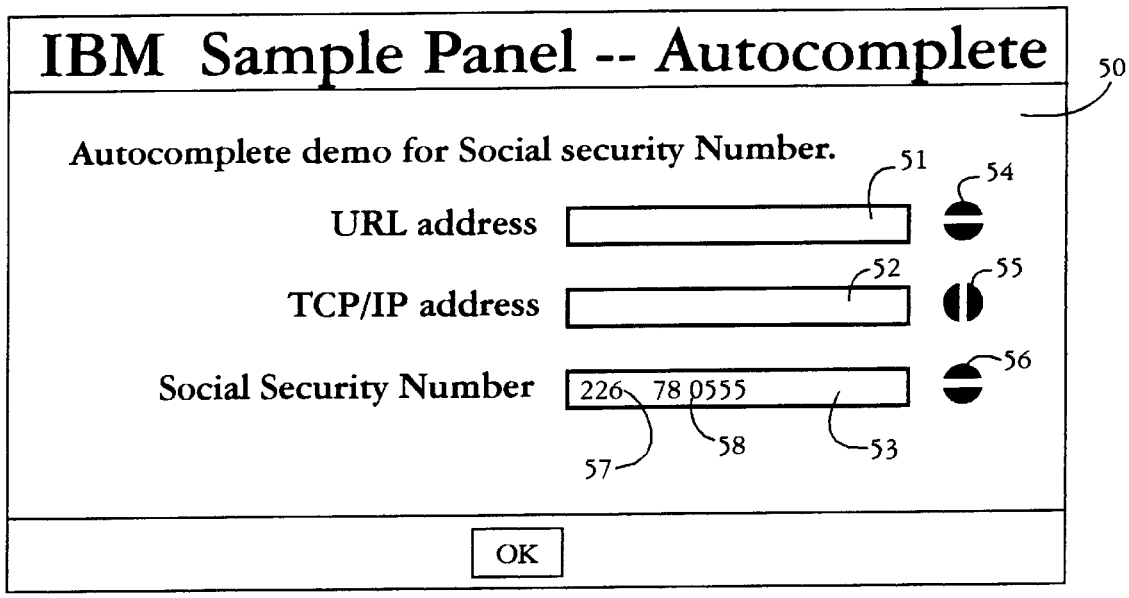
FIG. 4 is the same display screen of FIG. 3 at a point where the autocomplete function takes over and completes the entry started in FIG. 3.
Figure 5:
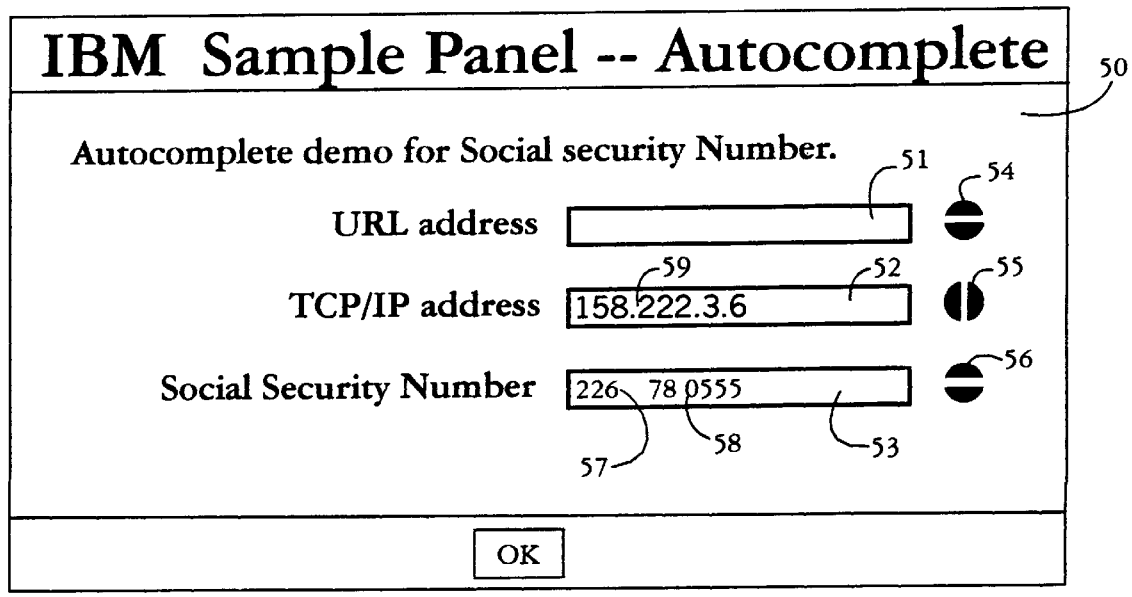
FIG. 5 is the same display screen of FIG. 4 at a point where the user has made an additional entry in a field without autocomplete.

With reference to FIG. 2, an illustrative data entry display screen is shown. There are three data entry fields: URL address 51, TCP/IP address 52 and Social Security Number 53. Of these fields, the autocomplete function is enabled in fields 51 and 53 and disabled in field 55. The status of autocomplete for each field is shown by the position of its corresponding indicator, 54–56, i.e. indicators 54 and 56 have a horizontal line which indicates that corresponding fields 51 and 53 have the autocomplete function, while indicator 55 has a vertical line which indicates that autocomplete is off for entry field 52. Considering now the entry of data into a field with autocomplete, in FIG. 3 the first portion 57 of a Social Security Number is entered by the user. Upon the entry of portion 57, the autocomplete function provides portion 58, FIG. 4, which, if the user accepts as correct, completes the Social Security Number. The mode of operation of this autocomplete may be based on a variety of standard functions such as completely alphanumerical ascending or descending sort, frequency, recentness, etc. Then the user makes an entry 59 into field 52, TCP/IP address, FIG. 5. Since the autocomplete for this field is off, the user completes all of the alphanumeric data for entry 59.

With respect to the simplified illustrations of FIGS. 2 through 5, each of the data entry fields 51–53 has been shown as having an autocomplete function as signified by the present of a corresponding indicator 54–56. It should be noted that often in a data entry panel, there are data entry fields without any autocomplete function whatsoever. Thus if this were the case here in a panel like that of FIG. 5, there would be data entry fields without any corresponding indicators such as 54–56. Then, there would be three different types of fields: those without an autocomplete function with no corresponding indicator; those with an enabled autocomplete function with a corresponding indicator in the horizontal position, and those with an autocomplete function in the disabled state with a corresponding indicator in the vertical position.

Figure 6:
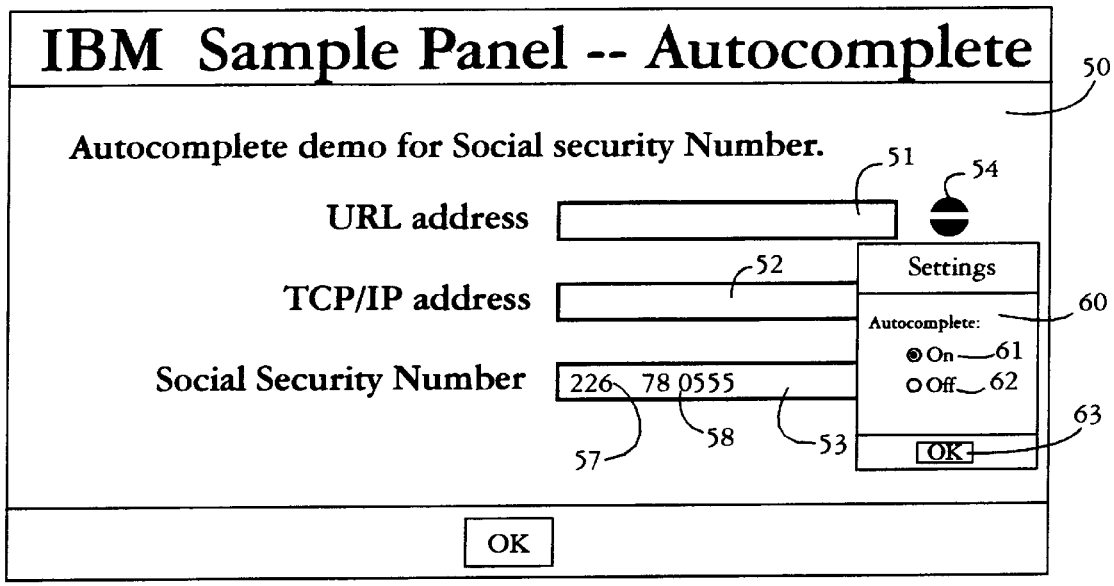
FIG. 6 shows the display screen of FIG. 4 at a point where the user has decided to change the autocomplete function for an entry field and has activated an On/Off dialog box to change this setting.
Figure 7:
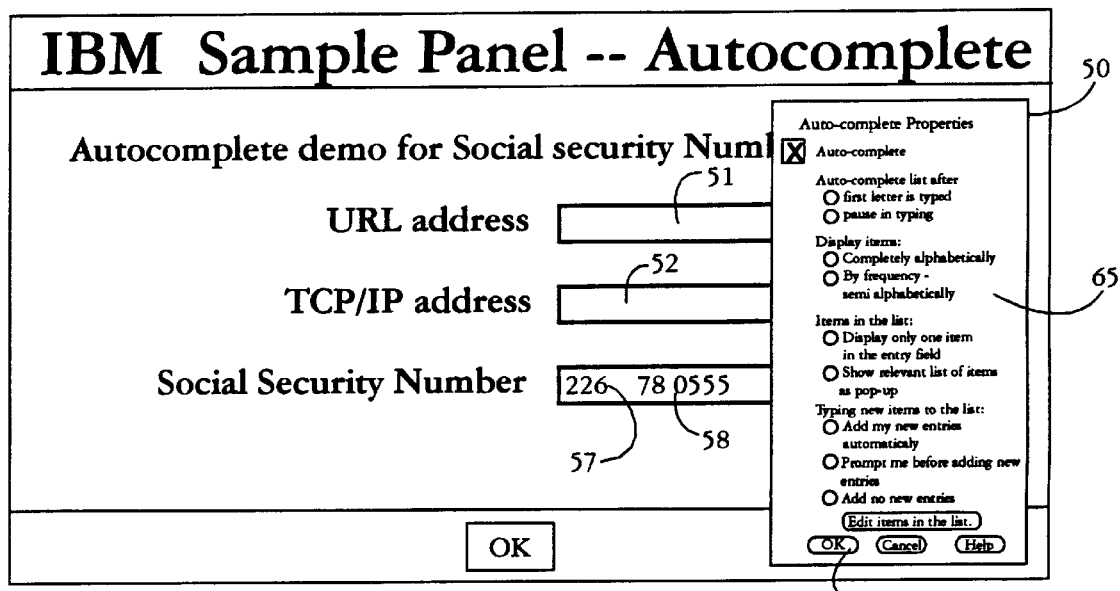
FIG. 7 shows the display screen of FIG. 4 at a point where the user has decided to change the autocomplete function for an entry field and has activated a dialog box used to change a variety of autocomplete functions.

Now that we have given this simple illustration of the selected autocomplete for designated fields and the indication of such selection, we will describe, with respect to FIGS. 6 and 7, some illustrations of how the user may change autocomplete settings. First, referring to FIG. 6, we will describe how On/Off or disable/enable settings may be changed for particular fields. The particular field is designated, e.g. by pointing to its corresponding indicator 54–56 with the cursor. This results in the dialog 60, FIG. 6, where there is the simple choice to either set the autocomplete on 61 or off 62 and then to press select button 63 to complete the selection. The change would then be recorded and stored and the appropriate status indicator 54–56 changed. Of course, the user may wish to change the mode of operation of the autocomplete function by modifying any of a variety of autocomplete properties. In such a situation he would bring up a more elaborate dialog box 65, as shown in FIG. 7, from which several properties may be modified, such as when in the entry autocomplete kicks in, the order of display, e.g. based on frequency or completely alphabetically, whether single or multiple proposed entries for the field are presented and how items are to be added to the database or library which provides proposed entries. After the user has selected his combination of properties from dialog box 65, he may press the "OK" button for these properties to be so modified.

Figure 8:
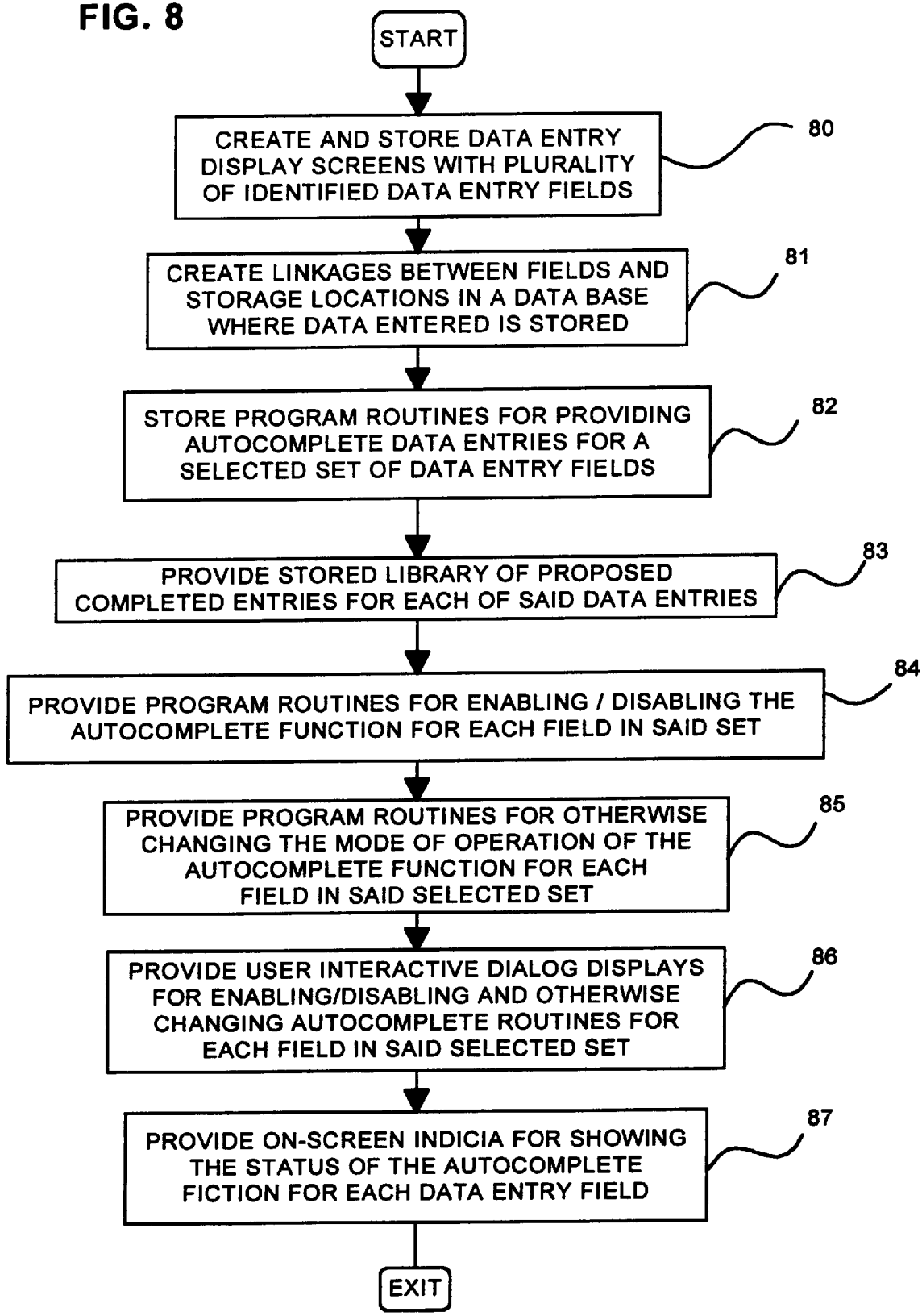
FIG. 8 is a flowchart showing the development of the program of the present invention for modifying or selectively disabling the autocomplete function.

Now, with reference to FIG. 8, we will describe the setting up or development of a program according to the present invention for selectively modifying autocomplete programs. The invention is applicable in the modification of any existing programs which offer to the interactive user proposed completions of data entries in fields when the user begins to enter data in a field. Data entry display screens with designated data entry fields are set up in the conventional manner, step 80; a typical data entry display screen is shown in FIG. 2. In the conventional manner, there are linkages between the data entry field and the designated databases where the entered data will be stored, step 81. Then, autocomplete functions are provided for each of the data entry fields, step 82. Actually, these autocomplete functions are customarily provided for less than all of the data entry fields since many data entry fields do not require autocomplete. Thus, we have referred to a set of fields to which the autocomplete function is applicable, and hereinafter in this description when we refer to the autocomplete function, we are of course referring to the entry fields with such autocomplete functions. These autocomplete functions are supported by a library of proposed completed entries for each of the data entry fields, step 83; such libraries of terms are usually stored on the hard disk drive of the system, e.g. storage device 20, FIG. 1, and then moved into the main memory 14 of the computer when needed to support the operation of the autocomplete program. The programming routines for enabling/disabling, or otherwise interactively modifying, the operation of the autocomplete functions for each of the entry fields are provided, steps 84 and 85, FIG. 8. Examples of such functions have been described with respect to FIGS. 6 and 7. User-interactive dialog boxes for enabling/disabling, or otherwise modifying, autocomplete operations as shown in FIGS. 6 and 7 are provided, step 86. On-screen indicia for showing the status of the autocomplete function for each data entry field are provided, step 87. These indicia 54–56 are shown and described in FIGS. 2 through 7.

Now that the basic programs have been described and illustrated, there will be described with respect to FIG. 9 a flow of a simple operation showing how the program could be run to selectively modify autocomplete functions for particular data entry fields by selecting or changing whether such fields are enabled/disabled. For simplicity in illustration in this portion of the description related to the running of the program we will only describe the changing of the enable/disable function of the autocomplete operation. However, it should be understood that the steps are equally applicable when applied to other modifications as described with respect to FIG. 7.

Figure 9:
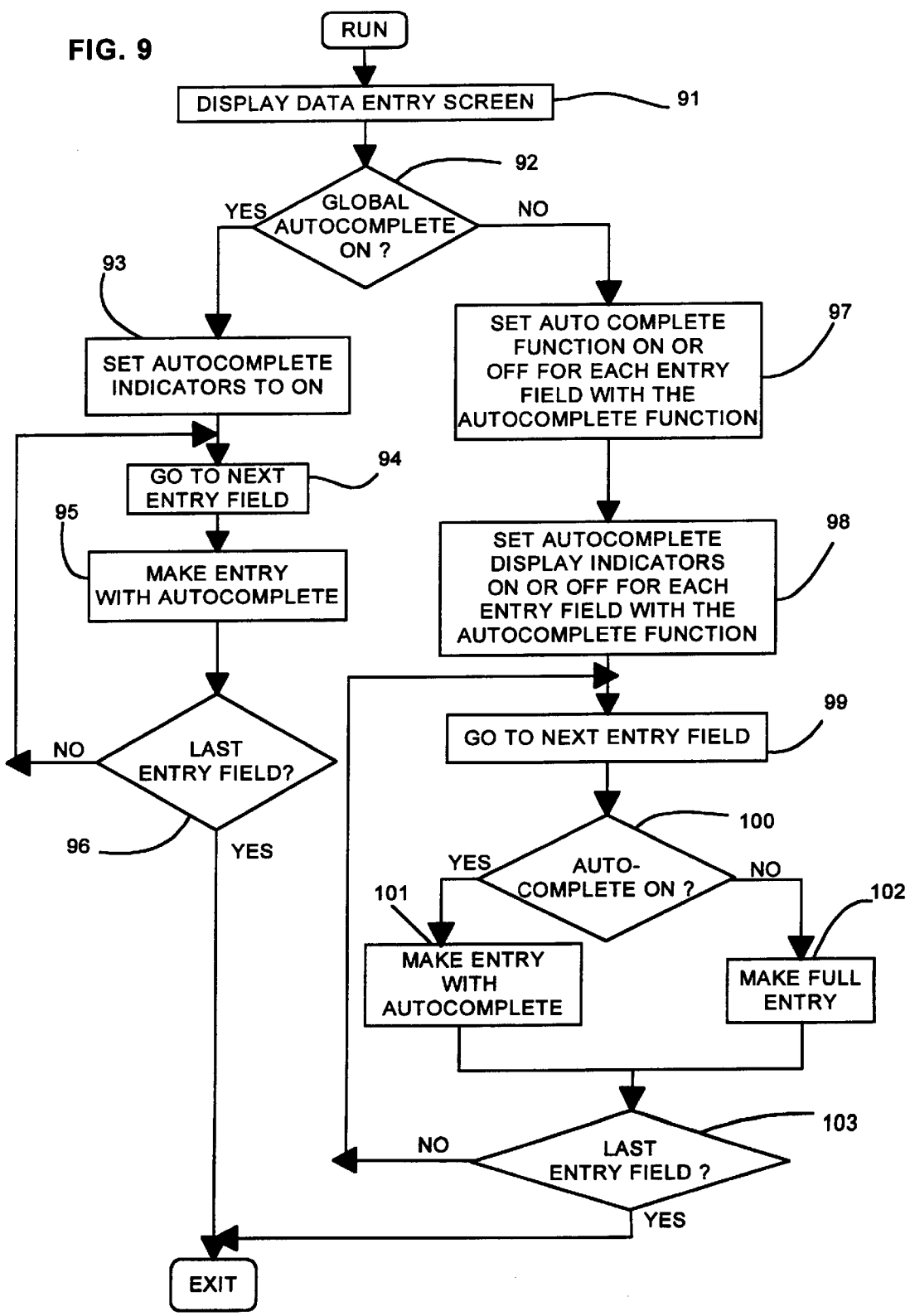
FIG. 9 is a flowchart showing the running of the program described with respect to FIG. 8.

First, step 91, FIG. 9, the data entry screen is displayed, e.g. the screen of FIG. 2. Then, step 92, a determination is made as to whether there is a "global" autocomplete on. The user is given the initial option of deciding that, for a particular session, he wishes the autocomplete function to be on for all entry fields. If Yes, step 93, then all of the autocomplete indicators will be set "On" and the process will step through each entry field on the screen, step 94, making each entry using autocomplete, step 95, until the last entry field is reached (decision step 96 is Yes) and the session is completed and exited.

On the other hand, if the global autocomplete is not to be on for all entry fields and the decision from step 92 is No, then step 97, the user may select to turn the autocomplete on/off, i.e. enable/disable for each entry field. In turn, this will result in the corresponding indicators to be set on/off, step 98. At this point, step 99, the user will go to each entry field in sequence. For each, a determination is made as to whether the autocomplete is on, decision step 100. If Yes, then, step 101, the entry is made using the autocomplete function; if No, then the user makes the full entry without autocomplete, step 102. When in decision step 103 it is determined the last entry has been made, the session is completed and exited.

The feature of the present invention covering displayed indicators showing the status of the autocomplete functions with respect to particular data entry fields has been illustrated with respect to the enable/disable function. It should be noted that the status of any of the other modifications described with respect to FIG. 7 may be similarly shown. In fact, even if the autocomplete is in the on or enable state for a particular field, the user could be given the further set up option of having the autocomplete indicator showing "on" only if the user actually uses the autocomplete for an entry field with an enabled autocomplete. In other words, if for a given field the autocomplete is enabled but the user chooses not to use the provided completions but uses his own full entry, then he may have selected the option of having the indicator "off" so that he will know at a glance whether any field has his own or an autocompleted entry irrespective of whether the autocomplete is "on" for that field.

Although certain preferred embodiments have been shown and described, it will be understood that many changes and modifications may be made therein without departing from the scope and intent of the appended claims.

What is claimed is:

1. A computer controlled user-interactive display system having a user interface comprising:

a plurality of data entry fields on said display, means for interactive user entry of data into said fields, means responsive to the commencement of a user entry of data into any of said data entry fields, for automatically providing a proposed completion of said commenced user entry, and user-interactive means for selectively disabling for each of said plurality of data entry fields, said means for automatically providing a proposed completion.

2. The computer controlled user-interactive display system of claim 1 further including means for indicating whether said means for automatically providing a proposed completion of user entries has been disabled for a data entry field.

3. The computer controlled display system of claim 2 wherein said means for providing proposed completions, provides a plurality of completions for each of said fields.

4. The computer controlled display system of claim 2 wherein said means for indicating are implemented by highlighting of entry fields.

5. The computer controlled display system of claim 2 wherein said means for indicating are implemented by color differences in entry fields.

6. The computer controlled display system of claim 2 wherein said means for indicating are implemented by different symbols displayed in association with respective entry fields.

7. The computer controlled display system of claim 1 wherein at least some of the data entered into said fields is alphanumeric data.

8. The computer controlled display system of claim 1 further including means for enabling said means for automatically providing a proposed completion of a user entry for a data entry field which is not so enabled.

9. In a computer controlled user-interactive display system, a method of data entry comprising:

providing a plurality of data entry fields on said display, enabling the user entry of data into said fields, responsive to the commencement of a user entry of data into any of said data entry fields automatically providing a proposed completion of said commenced user entry, and selectively disabling for each of said plurality of data entry fields, said automatic provision of the proposed completion of said user entry.

10. The method of claim 9 further including the step of indicating whether said automatic provision of a proposed completion of a user entry has been disabled for a data entry field.

11. The method of claim 10 wherein a plurality of proposed completions is provided for each of said plurality of data entry fields.

12. The method of claim 10 wherein said indicating is implemented by highlighting of entry fields.

13. The method of claim 10 wherein said indicating is implemented by color differences in entry fields.

14. The method of claim 10 wherein said indicating is implemented by different symbols displayed in association with respective entry fields.

15. The method of claim 9 wherein at least some of the data entered into said fields is alphanumeric data.

16. The method of claim 9 further including the step of enabling said automatic provision of a proposed completion of a user entry for a data entry field which is not so enabled.

17. A computer controlled display program having program code included on a computer readable medium for a user-interactive interface for data entry into a computer controlled display comprising:

means for providing a plurality of data entry fields on said display, means for enabling interactive user entry of data into said fields, means responsive to the commencement of a user entry of data into any of said data entry fields for automatically providing a proposed completion of said commenced user entry, and user-interactive means for selectively disabling for each of said plurality of data entry fields, said means for automatically providing a proposed completion.

18. The computer program of claim 17 further including means for indicating whether said means for automatically providing a proposed completion of user entries has been disabled for a data entry field.

19. The computer program of claim 18 wherein said means for providing proposed completions provide a plurality of completions for each of said fields.

20. The computer program of claim 18 wherein said means for indicating are implemented by highlighting of entry fields.

21. The computer program of claim 18 wherein said means for indicating are implemented by color differences in entry fields.

22. The computer program of claim 18 wherein said means for indicating are implemented by different symbols displayed in association with respective entry fields.

23. The computer program of claim 17 wherein at least some of the data entered into said fields is alphanumeric data.

24. The computer program of claim 17 further including means for enabling said means for automatically providing a proposed completion of a user entry for a data entry field which is not so enabled.

* * * * *